(12) United States Patent
Telefus et al.

(10) Patent No.: US 10,511,231 B2
(45) Date of Patent: Dec. 17, 2019

(54) RECONSTRUCTIVE LINE MODULATED RESONANT CONVERTER

(71) Applicant: Flex Ltd., Singapore (SG)

(72) Inventors: Mark Telefus, Orinda, CA (US); Nate Vince, San Jose, CA (US)

(73) Assignee: Flex Ltd., Singapore (SG)

( * ) Notice: Subject to any disclaimer, the term of this patent is extended or adjusted under 35 U.S.C. 154(b) by 0 days.

(21) Appl. No.: 16/105,348

(22) Filed: Aug. 20, 2018

(65) Prior Publication Data

US 2019/0058417 A1 Feb. 21, 2019

Related U.S. Application Data

(60) Provisional application No. 62/548,325, filed on Aug. 21, 2017.

(51) Int. Cl.
| | | |
|---|---|---|
| *H02M 3/335* | (2006.01) | |
| *H02M 1/00* | (2006.01) | |
| *H02M 1/10* | (2006.01) | |
| *H02M 1/34* | (2007.01) | |
| *H02M 7/48* | (2007.01) | |

(52) U.S. Cl.
CPC .......... *H02M 3/33569* (2013.01); *H02M 1/10* (2013.01); *H02M 2001/0058* (2013.01);
(Continued)

(58) Field of Classification Search
CPC ..... H02M 3/335–42; H02M 2001/0045–0058; H02M 2001/342; H02M 2001/0083
See application file for complete search history.

(56) References Cited

U.S. PATENT DOCUMENTS

| | | | |
|---|---|---|---|
| 3,461,372 A | | 8/1969 | Barton |
| 4,607,322 A | * | 8/1986 | Henderson .......... H02M 3/3378 361/91.7 |

(Continued)

FOREIGN PATENT DOCUMENTS

| | | |
|---|---|---|
| EP | 3447890 A1 | 2/2019 |
| EP | 3447895 A1 | 2/2019 |

OTHER PUBLICATIONS

"Transfer Synthesis for VHF Converters", Anthony D. Sagneri, David I Anderson, David J. Perreault, Laboratory for Electromagnetic and Electronic Systems, Massachusetts Institute of Technology, Room 10-171, Cambridge, Massachusetts 02139. National Semiconductor Corporation, 2900 Semiconductor Drive, Santa Clara, CA 95052-8090, 7 pages.

(Continued)

*Primary Examiner* — Gustavo A Rosario-Benitez
*Assistant Examiner* — Peter M Novak
(74) *Attorney, Agent, or Firm* — Haverstock & Owens LLP

(57) ABSTRACT

A resonant power converter includes an event generator and multiple separate resonant tanks configured as second harmonic filters. The event generator is configured to generate a predetermined resonant switching frequency to which the resonant tanks are tuned, to selectively apply voltage stress harmonic links using the resonant tanks, and to control zero voltage switching time and peak current through the switching devices. Configuring and operating the resonant power converter in the manner described herein enables the resonant power converter to maintain a substantially constant efficiency over varying input line voltage, making the efficiency of the resonant power converter substantially independent of the input line voltage value.

16 Claims, 1 Drawing Sheet

(52) U.S. Cl.
CPC ............... *H02M 2001/342* (2013.01); *H02M 2007/4818* (2013.01)

(56) References Cited

U.S. PATENT DOCUMENTS

| | | | |
|---|---|---|---|
| 4,788,634 | A | 11/1988 | Schlecht |
| 5,439,498 | A | 8/1995 | Ingemi |
| 7,742,318 | B2 | 6/2010 | Fu |
| 8,867,237 | B2 | 10/2014 | Desimone |
| 9,178,438 | B2 | 11/2015 | Fu |
| 9,812,974 | B2 | 11/2017 | Imai |
| 9,893,647 | B2 | 2/2018 | Imai |
| 10,186,985 | B1 | 1/2019 | Tao |
| 2005/0099827 | A1 | 5/2005 | Sase et al. |
| 2007/0171680 | A1 | 7/2007 | Perrault |
| 2007/0236967 | A1 | 11/2007 | Liu et al. |
| 2016/0322968 | A1 | 11/2016 | Mao et al. |
| 2016/0352234 | A1* | 12/2016 | Imai ...................... H02M 3/158 |
| 2016/0352235 | A1* | 12/2016 | Imai ................. H02M 3/33569 |
| 2017/0063411 | A1 | 3/2017 | Ripley |
| 2017/0117819 | A1 | 4/2017 | Chen |
| 2017/0346405 | A1* | 11/2017 | Lin ......................... H02M 1/08 |
| 2018/0294742 | A1* | 10/2018 | Qiu ....................... H02M 7/537 |
| 2019/0089254 | A1 | 3/2019 | Op Het Veld |

OTHER PUBLICATIONS

STIC search report from EIC 2800 Searcher, John DiGeronimo, Oct. 23, 2019, 21 pages.

\* cited by examiner

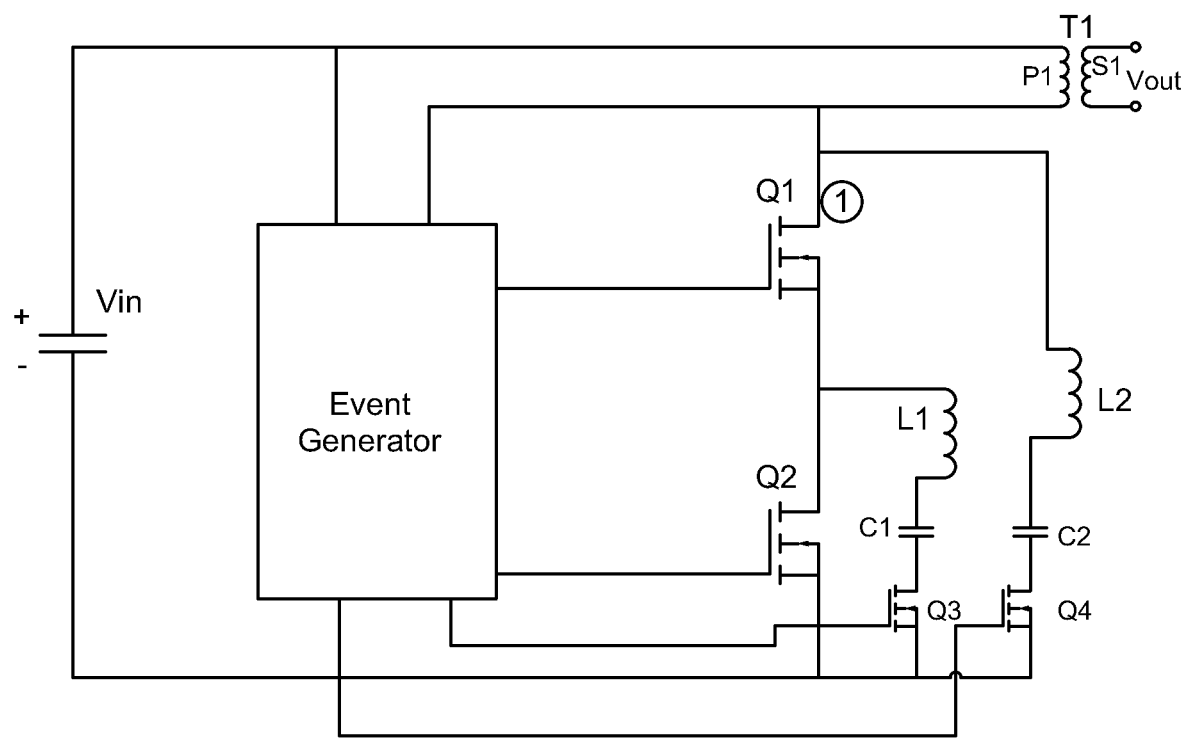

RECONSTRUCTIVE LINE MODULATED RESONANT CONVERTER

RELATED APPLICATIONS

This patent application claims priority under 35 U.S.C. 119(e) of the U.S. provisional patent applications, Application Ser. No. 62/548,325, filed on Aug. 21, 2017, and entitled "Reconstructive Line Modulated Resonant Converter", which is hereby incorporated in its entirety by reference.

FIELD OF THE INVENTION

The present invention is generally directed to the field of power converters. More specifically, the present invention is directed to a resonant power converter used for power management and power supply.

BACKGROUND OF THE INVENTION

There are several power converter topologies that have been developed over the years, which are intended to improve the power density and switching efficiency of power converters. An emerging focus of new converter topologies is to provide a means to reduce or eliminate converter switching losses, while increasing the switching frequencies. Lower loss and higher switching frequency means more efficient converters, which can reduce the size and weight of converter components. Additionally, with the introduction of high speed composite semiconductor switches, such as metal oxide semiconductor field effect transistor (MOSFET) switches operated by pulse width modulation (PWM), recent forward and flyback topologies are now capable of operation at greatly increased switching frequencies, such as, for example, up to and greater than 1 MHz.

However, an increase in switching frequency can cause a corresponding increase in switching and component stress related losses, as well as increased electromagnetic interference (EMI), noise, and switching commutation problems, due to the rapid ON/OFF switching of the semiconductor switches at high voltage and/or high current levels. Moreover, modern electronic components are expected to perform multiple functions, in a small space, efficiently, and with few undesirable side effects. For instance, a modern voltage converter that provides for relatively high power density and high switching frequencies, should also include uncluttered circuit topologies, provide for isolation of the output or "load" voltage from the input or "source" voltage, and also provide for variable step-up or step-down voltage transformation.

A drawback to many of the conventional power converter circuits is the relatively high voltage and current stress suffered by the switching components. Additionally, high turn-off voltage (caused by the parasitic oscillation between transformer leakage inductance and switch capacitance) seen by the primary switch traditionally requires the use of a resistor, capacitor, diode subcircuit, such as a snubber circuit. This parasitic oscillation is extremely rich in harmonics and pollutes the environment with EMI, and causes high switching losses from the switching components in the form of extra thermal dissipation.

In an effort to reduce or eliminate the switching losses and reduce EMI noise the use of "resonant" or "soft" switching techniques has been increasingly employed in the art. The application of resonant switching techniques to conventional power converter topologies offers many advantages for high density, and high frequency, to reduce or eliminate switching stress and reduce EMI. Resonant switching techniques generally include an inductor-capacitor (LC) subcircuit in series with a semiconductor switch which, when turned ON, creates a resonating subcircuit within the converter. Further, timing the ON/OFF control cycles of the resonant switch to correspond with particular voltage and current conditions across respective converter components during the switching cycle allows for switching under zero voltage and/or zero current conditions. Zero voltage switching (ZVS) and/or zero current switching (ZCS) inherently reduces or eliminates many frequency related switching losses.

The application of such resonant switching techniques to conventional power converter topologies offers many advantages for high density, high frequency converters, such as quasi sinusoidal current waveforms, reduced or eliminated switching stresses on the electrical components of the converter, reduced frequency dependent losses, and/or reduced EMI. However, energy losses incurred during control of zero voltage switching and/or zero current switching, and losses incurred during driving, and controlling the resonance means, are still problematic. In the field of applying resonant converters for power management and power supply, a critical task is to eliminate losses and maintain high efficiency over a wide input voltage range.

SUMMARY OF THE INVENTION

Embodiments are directed to a resonant power converter. In free running resonant power converter topology, variation in the input line voltage (input voltage supply), and especially under high line voltage conditions, results in the converter being subject to a high degree of losses in magnetics as well as switching devices. A free running resonant power converter topology constitutes a fixed constant switching frequency and constant duty cycle. In such an environment, if the input line voltage increases by a factor of three, such as the increase from a low line voltage of 90 Vrms to a high line voltage of 270 Vrms, then the corresponding peak current through the main switching device also increases by a factor of three, which results in power dissipation increasing by a factor of nine. The resonant power converter of the present application reduces the voltage stress and high peak current flow, which reduces such power losses. The resonant power converter includes an event generator and multiple separate resonant tanks configured as second harmonic filters. The event generator is configured to generate a predetermined resonant switching frequency to which the resonant tanks are tuned, to selectively apply voltage stress harmonic links using the resonant tanks, and to control zero voltage switching time and peak current through the switching devices. Configuring and operating the resonant power converter in the manner described herein enables the resonant power converter to maintain a substantially constant efficiency over varying input line voltage, making the efficiency of the resonant power converter substantially independent of the input line voltage value.

In an aspect, a resonant power converter is configured to receive as input a varying input voltage from an input voltage source and to output an output voltage. The resonant power converter comprises a transformer, a first switch, a second switch, a third switch, a fourth switch, a first resonant tank, a second resonant tank, and a signal processing circuit. The transformer has a primary winding and a secondary winding, wherein the secondary winding is coupled to an output of the resonant power converter. The first switch comprises a first terminal, wherein the first terminal is coupled in series to the primary winding. The second switch is coupled in series to the first switch. The first resonant tank is coupled in series with the third switch, wherein the series coupled first resonant tank and third switch are coupled in parallel across the second switch. The second resonant tank is coupled in series with the fourth switch, wherein the series coupled second resonant tank and fourth switch are coupled in parallel across the series coupled first switch and second switch. The signal processing circuit is coupled to the input voltage supply, to the first terminal of the first switch, and to each of the first switch, the second switch, the third switch, and the fourth switch. The signal processing circuit is configured to sense the input voltage and a first terminal voltage, and to selectively drive each of the first switch, the second switch, the third switch, and the fourth switch according to the sensed input voltage and first terminal voltage. In some embodiments, the first switch, the second switch, the third switch, and the fourth switch are each transistor switches. In some embodiments, the transistor switch corresponding to the first switch is a metal-oxide-semiconductor field-effect transistor (MOSFET), and the first terminal of the first switch is a drain of the MOSFET. In some embodiments, the first resonant tank comprises a first inductor coupled in series with a first capacitor, and the second resonant tank comprises a second inductor coupled in series with a second capacitor. In some embodiments, turning ON the third switch connects the first resonant tank across the second switch and the first resonant tank functions as a first 2D harmonics filter, and turning OFF the third switch disconnects the first resonant tank from across the second switch and the first resonant tank no longer functions as the first 2D harmonics filter. In some embodiments, turning ON the fourth switch connects the series coupled second resonant tank and fourth switch across the first switch and the second resonant tank functions as a second 2D harmonics filter, and turning OFF the fourth switch disconnects the series coupled second resonant tank and fourth switch from across the first switch and the second resonant tank no longer functions as the second 2D harmonics filter.

In some embodiments, the signal processing circuit is configured to sense the input voltage and first terminal voltage and if the sensed input voltage is less than a threshold value and the sensed first terminal voltage is greater than or equal to a first terminal threshold value then the first switch is turned and maintained ON, the second switch is switched ON and OFF at a switching frequency Fsw, the third switch is turned and maintained Off, and the fourth switch is turned and maintained OFF. In some embodiments, if the sensed input voltage is less than the threshold value and the sensed first terminal voltage is less than the first terminal threshold value then the first switch is turned and maintained ON, the second switch is switched ON and OFF at the switching frequency Fsw, the third switch is turned and maintained ON, and the fourth switch is turned and maintained OFF. In some embodiments, if the sensed input voltage is greater than or equal to the threshold value and the sensed first terminal voltage is greater than or equal to the first terminal threshold value then the first switch and the second switch are both switched ON and OFF at a second switching frequency that is greater than the switching frequency Fsw, the third switch is turned and maintained OFF, and the fourth switch is turned and maintained OFF. In some embodiments, if the sensed input voltage is greater than or equal to the threshold value and the sensed first terminal voltage is less than the first terminal threshold value then the first switch and the second switch are both switched ON and OFF at the second switching frequency, the third switch is turned and maintained OFF, and the fourth switch is turned and maintained ON. In some embodiments, when the first switch and the second switch are both switched ON and OFF at the second switching frequency, the first switch and the second switch are synchronized to both switch ON and OFF at the same time. In some embodiments, the second switching frequency is three times the switching frequency Fsw. In some embodiments, the threshold value is 135 Vrms, and the first terminal threshold value is 2.5 times the sensed input voltage value. In some embodiments, the switching frequency Fsw is a predetermined and fixed value with a constant duty cycle. In some embodiments, turning ON the third switch connects the first resonant tank across the second switch, and turning OFF the third switch disconnects the first resonant tank from across the second switch. In some embodiments, turning ON the fourth switch connects the second resonant tank across the series connected first switch and second switch, and turning OFF the fourth switch disconnects the second resonant tank from across the series connected first switch and second switch.

In another aspect, a free running resonant power converter is configured to receive as input a varying input voltage from an input voltage source and to output an output voltage. The free running resonant power converter comprises a resonant power converter and a signal processing circuit. The resonant power converter has a main switch and multiple variably enabled resonant tanks. The signal processing circuit is coupled to the resonant power converter to selectively enable various ones of the multiple variably enabled resonant tanks according to a sensed value of the input voltage and to a sensed value of a first terminal of the main switch to maintain a constant efficiency of the free running resonant power converter over varying input line voltage values.

BRIEF DESCRIPTION OF THE DRAWING

Several example embodiments are described with reference to the drawings, wherein like components are provided with like reference numerals. The example embodiments are intended to illustrate, but not to limit, the invention. The drawings include the following figures:

FIG. 1 illustrates a schematic circuit diagram of a resonant power converter according to some embodiments.

DETAILED DESCRIPTION OF THE EMBODIMENTS

Embodiments of the present application are directed to a resonant power converter. Those of ordinary skill in the art will realize that the following detailed description of the resonant power converter is illustrative only and is not intended to be in any way limiting. Other embodiments of the resonant power converter will readily suggest themselves to such skilled persons having the benefit of this disclosure.

Reference will now be made in detail to implementations of the resonant power converter as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 illustrates a schematic circuit diagram of a resonant power converter according to some embodiments. The resonant power converter includes a transformer T1, transistor switches Q1, Q2, Q3, and Q4, inductors L1 and L2, capacitors C1 and C2, and an event generator. The transformer T1 includes a primary winding P1 and a secondary winding S2. The secondary winding voltage is rectified and filtered, such as by using a diode and a capacitor, which is provided as an output voltage Vout. In some embodiments, the resonant power converter is configured as a flyback converter. It is understood that the resonant power converter can be alternatively configured according to other conventional converter schemes. In some embodiments, the transistor switches Q1, Q2, Q3, and Q4 are each a metal-oxide-semiconductor field-effect transistors (MOSFETs). In the exemplary configuration shown in FIG. 1, the transistor switches Q1, Q2, Q3, and Q4 are n-channel MOSFETs. Alternatively, other types of semiconductor transistors can be used.

A first terminal of the primary winding P1 is coupled to the positive terminal of the input voltage supply Vin. A second terminal of the primary winding P1 is coupled to a drain of the transistor switch Q1 and to a first terminal of the inductor L2. A source of the transistor switch Q1 is coupled to a drain of the transistor switch Q2 and to a first terminal of the inductor L1. A source of the transistor switch Q2 is coupled to a negative terminal of the input voltage supply Vin. A second terminal of the inductor L1 is coupled to a first terminal of the capacitor C1. A second terminal for the capacitor C1 is coupled to a drain of the transistor switch Q3. A source of the transistor switch Q3 is coupled to the negative terminal of the input voltage supply Vin. A second terminal of the inductor L2 is coupled to a first terminal of the capacitor C2. A second terminal of the capacitor C2 is coupled to a drain of the transistor switch Q4. A source of the transistor switch Q4 is coupled to the negative terminal of the input voltage supply Vin. The inductor L1 and the capacitor C1 form a first resonant tank that functions as a second harmonic (2D harmonic) filter. The inductor L2 and the capacitor C2 form a second resonant tank that also functions as a second harmonic filter.

The event generator is coupled to the gates of each of the transistor switches Q1, Q2, Q3, and Q4. The event generator is also coupled to the positive terminal of the input supply voltage Vin and the first terminal of the primary winding P1, and the event generator is coupled to the drain of the transistor switch Q1 and the second terminal of the primary winding P1. The event generator includes signal processing circuitry capable of sensing and identifying the above described voltages and implementing control algorithms that generate appropriate drive signals for turning ON and OFF the transistor switches Q1, Q2, Q3, Q4. The event generator can include memory for storing and implementing the control algorithms and/or can have network communication interface and capability for accessing remote storage for accessing and implementing necessary data and/or control information for implementing the control algorithms. The signal processing circuitry of the event generator includes driving circuitry for generating the transistor switch drive signals. In some embodiments, the drive signals are generated to drive the transistor switches at a switching frequency Fsw, or at a multiple of the switching frequency Fsw as described below. The first resonant tank components, L1 and C1, and the second resonant tank components, L2 and C2, are tuned to the switching frequency Fsw.

In operation, the input voltage supply Vin is a variable voltage, such as varying from about 90 Vrms to 265 Vrms. It is understood that the input voltage supply Vin may vary over alternative voltage ranges. The event generator senses the input voltage Vin (line voltage) and a first terminal of the transistor switch Q1, which is the drain voltage Vd in the case of a n-channel MOSFET, to determine which transistor switches Q1, Q2, Q3, and Q4 are to be turned ON and OFF. For low line voltage, the event generator implements a first control algorithm. For high line voltage, the event generator implements a second control algorithm. In some embodiments, low line voltage is considered a voltage within the range of 90 Vrms to 135 Vrms, and high line voltage is considered a voltage within the range of greater than 135 Vrms to 265 Vrms or greater. It is understood that the demarcation point, or threshold value, for example 135 Vrms, between low line voltage and high line voltage can be different than the exemplary case of 135 Vrms. If the input voltage Vin is a low line voltage, then the first control algorithm is implemented. In the first control algorithm, the transistor switch Q1 is turned ON and the second transistor switch Q2 is switched ON and OFF at the switching frequency Fsw. While the input supply voltage Vin is the low line voltage, if the drain voltage Vd of the transistor switch Q1 is less than a drain voltage threshold value, then the transistor switch Q3 is turned ON and the transistor switch Q4 is turned OFF. In some embodiments, the drain voltage threshold value is 2.5 times that of the input supply voltage Vin. It is understood that alternative drain voltage threshold values can be used. Turning ON the transistor switch Q3 connects the first resonant tank formed by the inductor L1 and the capacitor C1, and turning OFF the transistor switch Q4 disconnects the second resonant tank formed by the inductor L2 and the capacitor C2. While the input supply voltage Vin is the low line voltage, if the drain voltage Vd of the transistor switch Q1 is greater than or equal to the drain voltage threshold value, then the transistor switch Q3 and the transistor switch Q4 are both turned OFF.

If the input voltage Vin is a high line voltage, then the second control algorithm is implemented. In the second control algorithm, the transistor switches Q1 and Q2 are both switched ON and OFF at a second switching frequency that is greater than the switching frequency Fsw, and the transistor switch Q3 is turned OFF. In some embodiments, the second switching frequency is 3×Fsw. In other embodiments, the second switching frequency is an integer multiple of the switching frequency Fsw. It is understood that alternative second switching frequencies can be used. In some embodiments, the transistor switches Q1 and Q2 are synchronized to turn ON and OFF at the same time. Turning OFF the transistor switch Q3 disconnects the first resonant tank formed by the inductor L1 and the capacitor C1. While the input supply voltage Vin is the high line voltage, if the drain voltage Vd of the transistor switch Q1 is less than the drain voltage threshold value, then the transistor switch Q4 is turned ON, while the transistor switch Q3 remains OFF and the transistor switches Q1 and Q2 remain switching at the second switching frequency, for example 3×Fsw. Turning ON the transistor switch Q4 connects the second resonant tank formed by the inductor L2 and the capacitor C2.

While the input supply voltage Vin is the high line voltage, if the drain voltage Vd of the transistor switch Q1 is greater than or equal to the drain voltage threshold value, then the transistor switch Q4 is turned OFF, while the transistor switch Q3 remains OFF and the transistor switches Q1 and Q2 remain switching at the second switching frequency. Turning OFF the transistor switch Q4 disconnects the second harmonic filter formed by the inductor L2 and the capacitor C2.

The present application has been described in terms of specific embodiments incorporating details to facilitate the understanding of the principles of construction and operation of the resonant power converter. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A resonant power converter configured to receive as input a varying input voltage from an input voltage source and to output an output voltage, the resonant power converter comprising:
    a transformer having a primary winding and a secondary winding, wherein the secondary winding is coupled to an output of the resonant power converter;
    a first switch comprising a first terminal, wherein the first terminal is coupled in series to the primary winding;
    a second switch coupled in series to the first switch;
    a first resonant tank coupled in series with a third switch, wherein the series coupled first resonant tank and third switch are coupled in parallel across the second switch;
    a second resonant tank coupled in series with a fourth switch, wherein the series coupled second resonant tank and fourth switch are coupled in parallel across the series coupled first switch and second switch; and
    a signal processing circuit coupled to the input voltage supply, to the first terminal of the first switch, and to each of the first switch, the second switch, the third switch, and the fourth switch, wherein the signal processing circuit is configured to sense the input voltage and a first terminal voltage, and to selectively drive each of the first switch, the second switch, the third switch, and the fourth switch according to the sensed input voltage and first terminal voltage.

2. The resonant power converter of claim 1 wherein the first switch, the second switch, the third switch, and the fourth switch are each transistor switches.

3. The resonant power converter of claim 2 wherein the transistor switch corresponding to the first switch is a metal-oxide-semiconductor field-effect transistor (MOSFET), and the first terminal of the first switch is a drain of the MOSFET.

4. The resonant power converter of claim 1 wherein the first resonant tank comprises a first inductor coupled in series with a first capacitor, and the second resonant tank comprises a second inductor coupled in series with a second capacitor.

5. The resonant power converter of claim 1 wherein turning ON the third switch connects the first resonant tank across the second switch and the first resonant tank functions as a first 2D harmonics filter, and turning OFF the third switch disconnects the first resonant tank from across the second switch and the first resonant tank no longer functions as the first 2D harmonics filter.

6. The resonant power converter of claim 1 wherein turning ON the fourth switch connects the series coupled second resonant tank and fourth switch across the first switch and the second resonant tank functions as a second 2D harmonics filter, and turning OFF the fourth switch disconnects the series coupled second resonant tank and fourth switch from across the first switch and the second resonant tank no longer functions as the second 2D harmonics filter.

7. The resonant power converter of claim 1 wherein the signal processing circuit is configured to sense the input voltage and first terminal voltage and if the sensed input voltage is less than a threshold value and the sensed first terminal voltage is greater than or equal to a first terminal threshold value then the first switch is turned and maintained ON, the second switch is switched ON and OFF at a switching frequency Fsw, the third switch is turned and maintained Off, and the fourth switch is turned and maintained OFF.

8. The resonant power converter of claim 7 wherein if the sensed input voltage is less than the threshold value and the sensed first terminal voltage is less than the first terminal threshold value then the first switch is turned and maintained ON, the second switch is switched ON and OFF at the switching frequency Fsw, the third switch is turned and maintained ON, and the fourth switch is turned and maintained OFF.

9. The resonant power converter of claim 8 wherein if the sensed input voltage is greater than or equal to the threshold value and the sensed first terminal voltage is greater than or equal to the first terminal threshold value then the first switch and the second switch are both switched ON and OFF at a second switching frequency that is greater than the switching frequency Fsw, the third switch is turned and maintained OFF, and the fourth switch is turned and maintained OFF.

10. The resonant power converter of claim 9 wherein if the sensed input voltage is greater than or equal to the threshold value and the sensed first terminal voltage is less than the first terminal threshold value then the first switch and the second switch are both switched ON and OFF at the second switching frequency, the third switch is turned and maintained OFF, and the fourth switch is turned and maintained ON.

11. The resonant power converter of claim 10 wherein when the first switch and the second switch are both switched ON and OFF at the second switching frequency, the first switch and the second switch are synchronized to both switch ON and OFF at the same time.

12. The resonant power converter of claim 10 wherein the second switching frequency is three times the switching frequency Fsw.

13. The resonant power converter of claim 10 wherein the threshold value is 135 Vrms, and the first terminal threshold value is 2.5 times the sensed input voltage value.

14. The resonant power converter of claim 10 wherein the switching frequency Fsw is a predetermined and fixed value with a constant duty cycle.

15. The resonant power converter of claim 10 wherein turning ON the third switch connects the first resonant tank across the second switch, and turning OFF the third switch disconnects the first resonant tank from across the second switch.

16. The resonant power converter of claim 10 wherein turning ON the fourth switch connects the second resonant tank across the series connected first switch and second switch, and turning OFF the fourth switch disconnects the second resonant tank from across the series connected first switch and second switch.

* * * * *